2,784,053
PREPARATION OF ALKALINE EARTH METAL BOROHYDRIDES

George L. Cunningham, John M. Bryant, and Emily M. Gause, San Antonio, Tex., assignors to Callery Chemical Company, Pittsburgh, Pa., a corporation of Pennsylvania No Drawing. Application September 3, 1954,
Serial No. 454,212

12 Claims. (Cl. 23—14)

This invention relates to a new and improved method for preparing alkaline earth metal borohydrides and more particularly to a new and improved method for preparing these borohydrides in substantial yields from sodium borohydride and metal salts by a metathetical reaction in certain specific solvents.

The alkaline earth metal borohydrides are extremely useful as selective reducing agents in numerous chemical reactions, as intermediates in the preparation of various boranes and as readily available and useful portable sources of hydrogen. The most common method for preparing these borohydrides involves the reaction of a metal hydride with diborane but this method is both circuitous and expensive. Other known methods for preparing alkaline earth metal borohydrides are either tedious or result in poor yields. Sodium borohydride is available commercially so it is the most convenient raw material for the preparation of other borohydrides by metathesis if satisfactory processes are available.

It is an object of this invention to provide a new and improved method for the preparation of alkaline earth metal borohydrides from sodium borohydride in substantial yields by direct metathesis in N,N-dimethylformamide or monoethanolamine.

Other objects of this invention will become apparent from time to time throughout the specification and claims as hereinafter related.

This new and improved method will be described more fully in the specification and the novelty thereof will be particularly pointed out and distinctly claimed.

This invention is based upon our discovery after intensive investigation of numerous compounds of two solvents in which sodium borohydride as well as the chlorides and sulfates of the alkaline earth metals were relatively soluble but in which solvents sodium chloride and sodium sulfate were practically insoluble. The two solvents were N,N-dimethylformamide and monoethanolamine. Thus, it became possible to mix a solution of sodium borohydride in one of these solvents with a solution of an alkaline earth metal chloride or sulfate in the same solvent thereby causing sodium chloride or sodium sulfate to precipitate and leaving the alkaline earth metal borohydride in solution. The alkaline earth metal borohydride was then separated from the solvent by evaporation.

We have experimentally determined the solubilities at 25° C. of the various anhydrous salts used in this invention in the specific anhydrous solvents used herein and set forth the data in the table below in terms of grams salt/100 grams solvent.

| Salt | Solvent | |
|---|---|---|
|  | N,N-dimethylformamide | Monoethanolamine |
| NaBH₄ | 25.5 | 7.74 |
| SrCl₂ | 5.7 | 18.69 |
| BaCl₂ |  | 45.20 |
| CaCl₂ | 4.39 | 14.01 |
| MgSO₄ | 0.13 | 2.04 |
| Na₂SO₄ |  | Insol. |
| NaCl | 0.05 | 1.86 |

It should be noted that the salts and solvents used in this process must be anhydrous because of the fact that the alkaline earth borohydrides are quite sensitive to water which causes the borohydride ion to decompose with the evolution of hydrogen gas.

In carrying out this invention, it is not necessary but preferable to add the sodium borohydride and the alkaline earth metal salt in exactly equivalent amounts since if the two reactants are present in exactly equivalent amounts the resulting mother liquor will contain pure alkaline earth metal borohydride uncontaminated by any excess of either reactant used. It is also preferable to dissolve the reactants separately in the solvent used and then mix the two solutions. This is done because if solid sodium borohydride is added to a solution of an alkaline earth metal salt precipitation of one of the reaction products prevents the system from reaching equilibrium within a reasonable period of time. Similarly if a solid alkaline earth metal salt is added to a solution of sodium borohydride precipitation of one of the reaction products impedes the speed of the reaction.

In one experiment, a solution was prepared by dissolving 18.92 grams of sodium borohydride in 260 g. of monoethanolamine. This solution was mixed with another solution containing 52.07 g. of barium chloride dissolved in 120 g. of monoethanolamine and a slurry formed. The slurry was stirred four hours at 25° C., then filtered to remove 28.35 g. of sodium chloride which represented about 97% of the chloride ions present in the original slurry. The filtrate contained about 41.75 g. of barium borohydride, 0.88 g. of sodium chloride and 380 g. of monoethanolamine. The solvent was removed by evaporation under vacuum at room temperature and solvated crystals of solid barium borohydride were obtained. The yield of barium borohydride was 97.9% based on the barium chloride used. The identity of the barium borohydride was established by physical and chemical tests.

In another experiment, a solution was prepared by dissolving 18.91 g. of sodium borohydride and 27.79 g. of calcium chloride in 550 g. of N,N-dimethylformamide. The slurry which formed was stirred for four hours at 25° C., then filtered to remove about 28.35 g. of sodium chloride which represented about 97% of the chloride ions present in the original slurry. The filtrate contained about 18.43 g. of calcium borohydride, 0.78 g. of sodium chloride and 550 g. of N,N-dimethylformamide. The solvent was removed by evaporation under vacuum at room temperature and solvated crystals of solid calcium borohydride were obtained. The yield of calcium borohydride was 95.93% based on the calcium chloride used. The identity of the product was established by physical and chemical tests.

Strontium borohydride was prepared by three different procedures. In one experiment 37.82 g. of sodium borohydride were dissolved in 150 g. of N,N-dimethylformamide. This solution was added to a solution in which 79.27 g. of strontium chloride were dissolved in 1400 g. of N,N-dimethylformamide. The slurry which formed was stirred for four hours at 25° C., then filtered to remove about 57.7 g. of sodium chloride which represented about 98% of the chloride ions present in the original slurry. The filtrate contained about 68.64 g. of strontium borohydride and 0.75 g. of sodium chloride. Upon removal of the solvent by evaporation under vacuum at room temperature, solvated crystals of solid strontium borohydride were obtained. The yield of strontium borohydride was 98.91% based on the strontium chloride used. In the second method used for preparing this product, 18.91 g. of sodium borohydride and 39.64 g. of strontium chloride were added to 185 g. of N,N-dimethylformamide. The slurry which formed was stirred for four hours at 25° C. then filtered to remove about 28.64 g. of sodium chloride which represented about 98% of the chloride ions present in the original slurry. The filtrate contained about 34.32 g. of strontium borohydride and 0.58 g. of sodium chloride dissolved in 180 g. of N,N-dimethylformamide. The solvent was removed by evaporation under vacuum at room temperature and solvated crystals of solid strontium borohydride were obtained. The yield of strontium borohydride was 98.62% based on the strontium chloride used. In the third procedure used 18.91 g. of sodium borohydride were dissolved in 244 g. of monoethanolamine. This solution was added to a solution containing 39.64 g. of strontium chloride dissolved in 212 g. of monoethanolamine. The slurry which formed was stirred for four hours at 25° C., then filtered to remove 26.89 g. of sodium chloride which represented about 92% of the chloride ions present in the original slurry. The filtrate contained about 34.32 g. of strontium borohydride, 2.33 g. of sodium chloride and 440 g. of monoethanolamine. The solvent was removed by evaporation under vacuum at room temperature and solvated crystals of solid strontium borohydride were obtained. The yield of strontium borohydride was 93.64% based on the strontium chloride used. The identity of the strontium borohydride in all these methods was established by physical and chemical tests.

In still another experiment, magnesium borohydride was prepared as follows: 10.21 g. of sodium borohydride and 73.08 g. of vanthoffite ($MgSO_4 \cdot 3\ Na_2SO_4$) were dissolved in 130 g. of monoethanolamine. The slurry which formed was stirred for four hours at 25° C., then filtered to remove about 75.87 g. of sodium sulfate, which represented about 93% of the sulfate ions present in the original slurry.

After evaporation of the solvent in the filtrate solvated crystals of solid magnesium borohydride were obtained. The yield of magnesium borohydride was 90% based on the magnesium sulfate used. The identity of the final product was confirmed by physical and chemical tests. Since magnesium salts are very difficult to prepare absolutely anhydrous because of decomposition, it was found to be desirable to use the double salt of magnesium-sodium sulfate which is much more stable.

While several embodiments of this invention have been described in compliance with the patent laws it is to be understood that within the scope of the appended claims this invention may be practiced otherwise than as specifically described.

What we desire to claim and secure by Letters Patent of the United States is:

1. A method of preparing alkaline earth metal borohydrides which comprises reacting a solution of sodium borohydride in an anhydrous solvent of the group consisting of monoethanolamine and N,N-dimethylformamide, at about room temperature with an anhydrous salt of an alkaline earth metal which salt is soluble in said solvent, separating the sodium salt which precipitates from the solution and recovering a solution of the desired metal borohydride.

2. A method according to claim 1 in which the solvent is evaporated to recover the desired metal borohydride.

3. A method according to claim 1 in which the salt is of the group consisting of anhydrous chlorides and sulfates of alkaline earth metals.

4. A method according to claim 1 in which the metallic salt is a chloride of a metal of the group consisting of barium, calcium, strontium and magnesium.

5. A method according to claim 1 in which the metallic salt is magnesium sulfate.

6. A method according to claim 1 in which the sodium borohydride and metallic salt used are present in about equivalent amounts.

7. A method of preparing alkaline earth metal borohydrides which comprises dissolving sodium borohydride in an anhydrous solvent of the group consisting of ethanolamine and N,N-dimethylformamide dissolving in another portion of the solvent an anhydrous salt of an alkaline earth metal, mixing the two solutions thus formed at about room temperature, separating the sodium salt which precipitates from the solution, then evaporating the solvent and recovering the desired metal borohydride.

8. A method of preparing barium borohydride which comprises dissolving sodium borohydride in anhydrous monoethanolamine, dissolving anhydrous barium chloride in a second portion of the same solvent, mixing the two solutions thus formed at about room temperature, separating the sodium chloride which precipitates from the solution, then evaporating the solvent and recovering the barium borohydride.

9. A method of preparing calcium borohydride which comprises dissolving sodium borohydride and anhydrous calcium chloride in anhydrous N,N-dimethylformamide at about room temperature, separating the sodium chloride which precipitates from the reaction mixture, then evaporating the solvent and recovering the calcium borohydride.

10. A method of preparing magnesium borohydride which comprises dissolving sodium borohydride and anhydrous magnesium sulfate in anhydrous monoethanolamine at about room temperature, separating the sodium sulfate which precipitates from the reaction mixture, then evaporating the solvent and recovering the magnesium borohydride.

11. A method of preparing strontium borohydride which comprises dissolving sodium borohydride in anhydrous N,N-dimethylformamide, dissolving anhydrous strontium chloride in a second portion of the same solvent, mixing the two solutions thus formed at about room temperature, separating the sodium chloride which precipitates from the solution, then evaporating the solvent and recovering the strontium borohydride.

12. A method of preparing strontium borohydride which comprises dissolving sodium borohydride in anhydrous monoethanolamine, dissolving anhydrous strontium chloride in a second portion of the same solvent, mixing the two solutions thus formed at about room temperature, separating the sodium chloride which precipitates from the solution, then evaporating the solvent and recovering the strontium borohydride.

References Cited in the file of this patent

Kollonitsch et al.: Nature, vol. 173, No. 4394, pages 125 and 126 (January 16, 1954).